United States Patent [19]

Yoshida

[11] Patent Number: 5,088,353
[45] Date of Patent: Feb. 18, 1992

[54] FAILURE DETECTING SYSTEM FOR AUTOMATIC POWER TRANSMISSION

[75] Inventor: Toshiyasu Yoshida, Shizuoka, Japan

[73] Assignee: Jatco Corporation, Shizuoka, Japan

[21] Appl. No.: 448,545

[22] Filed: Dec. 11, 1989

[30] Foreign Application Priority Data

Dec. 13, 1988 [JP] Japan .................. 63-312891

[51] Int. Cl.$^5$ .................................. F16H 61/12
[52] U.S. Cl. .......................... 74/866; 364/424.1
[58] Field of Search .................. 74/866; 364/424.1

[56] References Cited

U.S. PATENT DOCUMENTS

| | | | |
|---|---|---|---|
| 4,393,732 | 7/1983 | Suzuki et al. | 74/866 |
| 4,467,427 | 8/1984 | Magnusson | 74/866 X |
| 4,499,542 | 2/1985 | Hamajima et al. | 74/866 X |
| 4,561,055 | 12/1985 | McKee | 74/866 X |
| 4,635,508 | 1/1987 | Tatsumi | 364/424.1 X |
| 4,730,521 | 5/1988 | Hayasaki et al. | 74/867 |
| 4,764,156 | 8/1988 | Ohkumo | 74/866 X |
| 4,835,694 | 5/1989 | Yamamoto et al. | 74/866 X |
| 4,838,125 | 6/1989 | Hamano et al. | 364/424.1 X |
| 4,896,569 | 1/1990 | Ito et al. | 74/866 |
| 4,955,258 | 9/1990 | Ito et al. | 74/866 |

Primary Examiner—Leslie A. Braun
Assistant Examiner—Khoi Q. Ta
Attorney, Agent, or Firm—Ronald P. Kananen

[57] ABSTRACT

A failure detecting system comprises sensor means which monitors preselected parameters representative of vehicle driving condition and thus detects the vehicle condition for driving the vehicle to travel. The sensor means includes one component detecting selector position commanding at least forward or reverse travel of the vehicle. An abnormality is detected on the basis of the vehicular driving condition indicative information provided by the sensor means, which information includes the selector position as detected by the selector position detecting component. In addition, a fail-safe system is responsive to detection of the abnormality by the failure detection system for performing fail-safe operation for controlling the automatic power transmission toward safety side in order to avoid subsidiary failure which otherwise caused by failed component.

11 Claims, 5 Drawing Sheets

| | C18 | C20 | C22 | C24 | B28 | B26 | OWC 30 | OWC 29 | GEAR RATIO | α1 = 0.440<br>α2 = 0.493 |
|---|---|---|---|---|---|---|---|---|---|---|
| D RANGE 1ST. SPEED | | | O | | | | O | O | $\frac{1+\alpha_2}{\alpha_2}$ | 3.027 |
| 2ND. SPEED | | O | O | | O | | O | | $\frac{\alpha_1+\alpha_2+\alpha_1\alpha_2}{\alpha_2(1+\alpha_1)}$ | 1.619 |
| 3RD. SPEED | | O | O | O | | | O | | 1 | 1.000 |
| 4TH. SPEED | | | (O) | O | O | | | | $\frac{1}{1+\alpha_1}$ | 0.694 |
| ENGINE BRAKING STATE 1ST. SPEED | | | (O) | | | O | (O) | (O) | | |
| 2ND. SPEED | | O | (O) | O | | | (O) | | | |
| 3RD. SPEED | | O | (O) | O | O | | (O) | | | |
| 4TH. SPEED | | | (O) | O | O | | | | | |
| REVERSE | O | | | | | O | | | $-\frac{1}{\alpha_1}$ | -2.272 |

FAILURE DETECTING SYSTEM FOR AUTOMATIC POWER TRANSMISSION

BACKGROUND OF THE INVENTION

1. Field of the Invention

The present invention relates generally to an automatic power transmission for an automotive vehicle. More specifically, the invention relates to a system for detecting failure in the automatic power transmission.

2. Description of the Background Art

Self-diagonosable automatic power transmissions which are provided with self-checking functions for detecting failure in shifting or so forth, have been developed in various fashions. For example, "Nissan Full-Range Electronically Controlled Automatic Transmission RE4R01A Service Manual", published by Nissan Motor Co., Ltd., in Mar. 1987, shows one example of a self-diagonosable automatic power transmission, which performs self-checking for identifying sensor, actuator, control unit or so forth, causing failure when failure of the transmission occurs. However, the self-checking function provided for this type of transmission is intended to be used for trouble shooting in the service station or factory. Therefore, the self-checking function is not effective for a driver to detect occurrence of failure. Therefore, when one component in the transmission or a transmission control system fails, such failure is difficult to detect. Therefore, it is possible that the failure of one components leads to severe failure in other components.

For example, when the fluid pressure in the forward clutch abnormally drops for causing slip in the forward clutch, the driver may not realize the failure in the pressure supply for the forward clutch and thus continue driving. In this circumstance, the driver may continue stepping on an accelerator pedal firmly to compensate for a drop in vehicle speed, so that clutch plates are maintained in a slipping state for causing substantial heat which results in seizure. Once the clutch plate causes seizure disconnection of the torque converter from the transmission gear via the clutch becomes impossible so that the driving power is still transmitted to the power train at the selector position commanding N range.

SUMMARY OF THE INVENTION

In view of the problems in the prior proposed self-diagonosable automatic power transmission, it is an object of the present invention to provide a fail-detecting system which can detect failure of components in the automatic power transmission.

Another object of the invention is to provide a fail-safe system associated with a fail-detecting system for preventing failure of one component of the automatic power transmission from becoming a cause for subsidiary failure.

In order to accomplish the aforementioned and other objects, a failure detecting system, according to the present invention, comprises sensor means which monitors preselected parameters representative of a vehicle driving condition and thus detects the vehicle condition for driving the vehicle to travel. The sensor means includes one component detecting a selector position commanding at least forward or reverse travel of the vehicle. An abnormality is detected on the basis of the vehicular driving condition indicative information provided by the sensor means, which information includes the selector position as detected by the selector position detecting component. In addition, a fail-safe system is responsive to detection of the abnormality by the fail-detection system for performing fail-safe operation for controlling the automatic power transmission toward a safety side in order to avoid subsidiary failure which otherwise is caused by a failed component.

According to one aspect of the invention, in an automotive automatic power transmission drivingly coupled with an output shaft of an engine and having a manual selector valve which is movable to assume a plurality of selector positions including a drive range position, a neutral range position, and a parking range position, the automatic power transmission being shiftable in speed ratio when the manual selector valve assumes the drive range position, a failure detecting system comprising:

first means for monitoring a set of vehicle operating variables and thus determining a predetermined vehicle driving condition when said set of vehicle operating variables monitored represents that a torque is transmitted by the automatic power transmission; and second means for detecting an actual vehicle driving condition inconsistent with said predetermined vehicle driving condition determined for detecting abnormality of the automatic power transmission.

According to another aspect of the invention, in an automotive automatic power transmission incorporating a plurality of control elements for setting speed ratio according to a manually entered command and a vehicle driving condition, a failure-detecting system comprises:

a first means for monitoring a selector position for detecting a transmission selector command other than that to be selected for stopping or parking the vehicle; first means for monitoring which one of the plurality of selector positions the manual selector valve assumes and determines whether or not the manual selector valve assumes the drive range position other than the neutral and parking range positions;

second means for monitoring an engine load on the engine;

third means for determining whether or not an automotive brake is released;

fourth means for monitoring an actual vehicle speed; and fifth means for comparing said actual vehicle speed with a predetermined vehicle speed for detecting abnormality of the power transmission when said actual vehicle speed is lower than said predetermined vehicle speed after said engine load monitored has been higher than a predetermined minimum load condition with the automotive brake released and the selector position monitored being the drive range position.

According to a further aspect of the invention, in an automotive automatic power transmission incorporating a plurality of control elements for setting speed ratio according to a manually entered command and a vehicle driving condition, a fail-safe system comprises:

first means for monitoring a set of vehicle operating variables and thus determining a predetermined vehicle driving condition when said set of vehicle operating variables monitored represents that a torque is transmitted by the automatic power transmission, second means for detecting an actual vehicle driving condition inconsistent with said predetermined vehicle driving condition determined for detecting abnormality of the automatic power transmission; and third means for performing a fail-safe operation in response to said second means detecting abnormality of the power transmission.

According to a yet further aspect of the invention, in an automotive automatic power transmission incorporating a plurality of control elements for setting a speed ratio according to a manually entered command and a vehicle driving condition, a failure-detecting system comprises:

first means for monitoring which one of the plurality of selector positions the manual selector valve assumes and determines whether or not the manual selector valve assumes the drive range position other than the neutral and parking range positions;

second means for monitoring an engine load on the engine;

third means for determining whether or not an automotive brake is released;

fourth means for monitoring an actual vehicle speed;

fifth means for comparing said actual vehicle speed with a predetermined vehicle speed for detecting abnormality of the power transmission when said actual vehicle speed is lower than said predetermined vehicle speed after said engine load monitored has been higher than a predetermined minimum load condition with the automotive brake released and the selector position monitored being the drive range position; and sixth means for performing a fail-safe operation in response to said fifth means detecting abnormality of the power transmission.

BRIEF DESCRIPTION OF THE DRAWINGS

The present invention will be understood more fully from the detailed description given herebelow and from the accompanying drawings of the preferred embodiment of the invention, which however, should not be taken to limit the invention to the specific embodiment, but are for explanation and drawings only.

In the drawings.

DESCRIPTION OF THE PREFERRED EMBODIMENT

Figure 1:
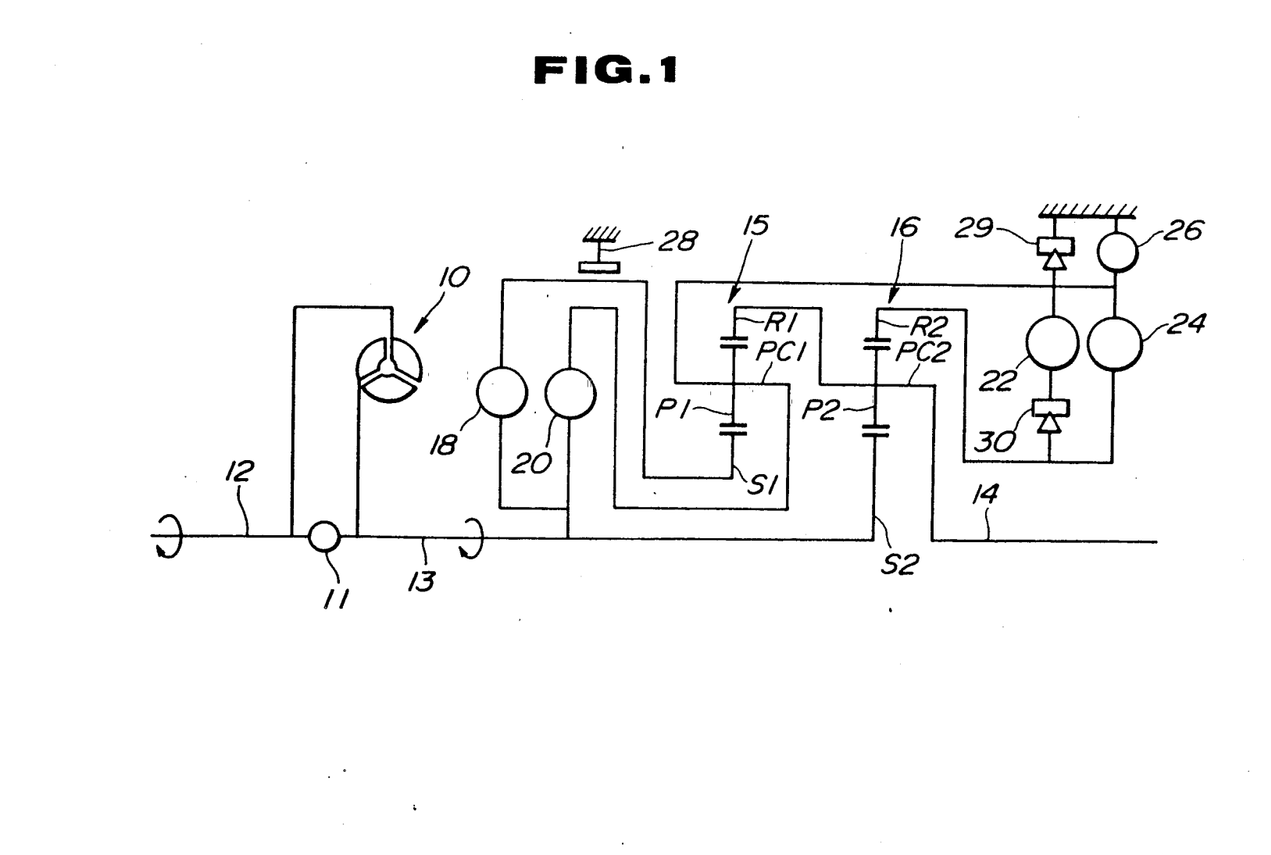
FIG. 1 is a diagrammatic illustration of an automatic power transmission to which the preferred embodiment of a shifting control system, according to the present invention, is applicable.

Referring now to the drawings, particularly to FIG. 1, there is shown an automatic power transmission having a power train of four forward speed ratios and one reverse speed ratio. The power transmission mechanism includes an input or turbine shaft 13 connected to an output shaft 12 of an automotive internal combustion engine as a prime mover, via a torque converter 10. The power transmission mechanism also includes an output shaft 14 for transmitting driving torque to a final drive. The torque converter 10 has a pump impeller, a turbine runner and a stator. The pump impeller is connected to the engine output shaft 12. On the other hand, the turbine runner is connected to the input shaft 13. The pump impeller is also connected to an oil pump for driving the latter. Between the input shaft 13 and the output shaft 14, a first planetary gear set 15, a second planetary gear set 16, a reverse clutch (R/C) 18, a high clutch (H/C) 20, a forward clutch (F/C) 22, an overrun clutch (OR/C) 24, low-and-reverse brake (LR/B) 26, a band brake (B/B) 28, low one-way clutch (LO/C) 29 and forward one-way clutch (FO/C) 30. The torque converter 10 incorporates a lock-up clutch 11. On the other hand, the first planetary gear set 15 includes a sun gear $S_1$, a ring gear $R_1$, pinions $P_1$ and a carrier $PC_1$ supporting the pinions. The second planetary gear set 16 includes a sun gear $S_2$, a ring gear $R_2$, pinions $P_2$ and a carrier $PC_2$ supporting the pinions.

The carrier $PC_1$ supporting the pinions $P_1$ is so designed as to be connectively associated with the input shaft 13 via a high clutch (H/C) 20. The carrier $PC_1$ is also connected to the ring gear $R_2$ of the second planetary gear set 16 via a forward clutch (F/C) 22 and a forward one-way clutch (FO/C) 30 which is coupled with the forward clutch in series, or in the alternative, via the forward clutch (F/C) 22 and a overrun clutch (OR/C) 24 which is provided in parallel to the forward one-way clutch (FO/C) 30. The carrier $PC_1$ is adapted to be anchored by a low and reverse brake (LR/B) and its reverse rotation is prevented by the low one-way clutch (LO/C). The sun gear $S_1$ of the first planetary gear set 15 is so designed as to be connectively associated with the input shaft 13 via a reverse clutch (R/C) 18. The sun gear $S_2$ of the second planetary gear set 16 is constantly connected to the input shaft 13. The ring gear $R_1$ of the first planetary gear set 15 and the carrier $PC_2$ of the second planetary gear set 16 are constantly connected to the output shaft 14. The ring gear $R_1$ is integrally connected with the carrier $PC_2$ of the second planetary gear set 16. The sun gear $S_2$ of the second planetary gear set 16 is connected to the input shaft 13. The ring gear $R_2$ is connectively associated with the carrier $PC_1$ via the overrun clutch (OR/C) 24. In order to establish a predetermined drive relation, the forward one-way clutch (FO/C) 30 and the forward clutch (F/C) 22 are arranged between the carrier $PC_1$ and the ring gear $R_2$ of the second planetary gear set 16. Engagement of the forward clutch (F/C) 22 causes the forward one-way clutch (FO/C) 30 to connect the ring gear $R_2$ with the carrier $PC_1$ in the reverse rotational direction.

A low and reverse brake (LR/C) 26 can fix the carrier $PC_1$. On the other hand, a band brake (B/B) 28 can fix the sun gear $S_1$. A low one-way clutch (LO/C) 29 permits rotation of the carrier $PC_1$ in a forward direction (i.e., the same direction as the rotating direction of the engine output shaft 12) and prevents the carrier $PC_1$ from rotating in a reverse direction (i.e., the opposite as the forward rotating direction).

Figure 2:
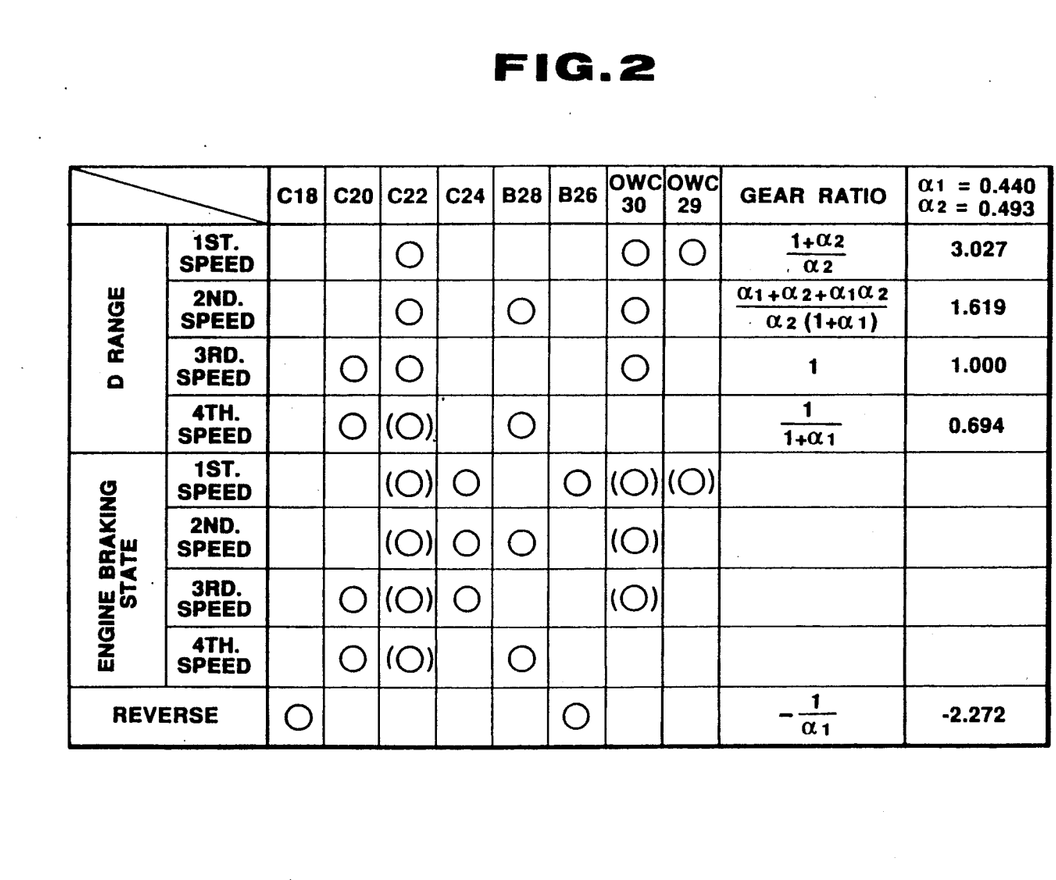
FIG. 2 is a chart showing active components of the power transmission of FIG. 1, which are active at a respective operational range.

The power train as set forth above has a selectable power transmission mode by a combination of the states of one or more friction elements, i.e. the reverse clutch (R/C) 18, the high clutch (H/C) 20, the forward clutch 22 (F/C), the overrun clutch (OR/C) 24, the low and reverse brake (LR/B) 26 and the band brake (B/B) 28, to establish various modes of operation of the components of $S_1$, $S_2$, $R_1$, $R_2$, $PC_1$ and $PC_2$ of the first and second planetary gear sets 15 and 16. With various modes of operation of the components of the first and second planetary gear sets 15 and 16, rotation speed at the output shaft 14 versus of the rotation speed at the input shaft 13 is varied at various rates. Active components at respective operational modes of the transmission are illustrated by indicating (o) in respective column in FIG. 2. In the table of FIG. 2, $\alpha_1$ and $\alpha_2$ are respective gear ratio of the sun gears $S_1$ and $S_2$ versus the ring gears $R_1$ and $R_2$. By a combination of the gear ratios $\alpha_1$ and $\alpha_2$, the ratio of rotation of the output shaft 14 versus the rotation speed of the input shaft 13 is determined.

Figure 3:
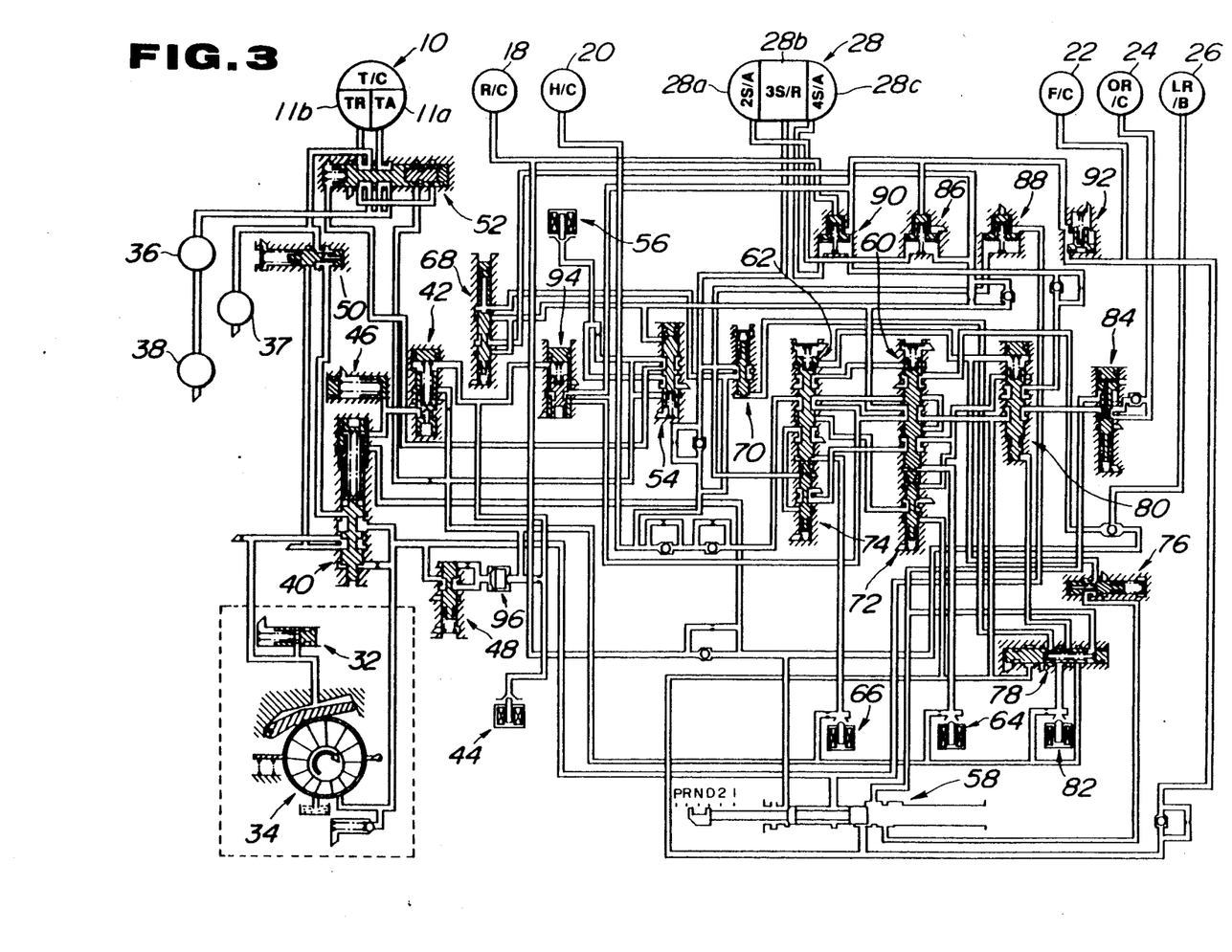
FIG. 3 is a circuit diagram of a hydraulic system of the automatic power transmission of FIG. 1.

The hydraulic system of the shown automatic power transmission, as shown in FIG. 3, provides hydraulic pressure controlling operation of respective friction elements. The hydraulic system includes a pressure regulator valve 40, a pressure modifier valve 42, a line pressure solenoid 44, a modifier pressure accumulator 46, a pilot valve 48, a torque converter release valve 50, a lock-up control valve 52, a first shuttle valve 54, a lock-up solenoid 56, a manual selector valve 58, a first shift valve 60, a second shift valve 62, a first shift solenoid 64, a second shift solenoid 66, a servo charger valve 68, a 3-2 timing valve 70, a 4-2 release valve 72, a 4-2 sequence valve 74, a first range pressure reduction valve 76, a second shuttle valve 78, an overrun clutch control valve 80, an overrun clutch solenoid 82, an overrun clutch pressure reduction valve 84, a second speed ratio servo apply pressure accumulator 86, a third speed ratio servo release pressure accumulator 88, a fourth speed ratio servo apply pressure accumulator 92, 90, an N-D accumulator, an accumulator control valve 94 and a strainer 96.

The pressure regulator valve 40 adjusts a line pressure by modulating the source pressure from the oil pump depending upon a driving condition. The pressure modifier valve 42 serves for assisting the pressure regulator valve 40 and adjusts signal pressure (modifier pressure) for providing adjusting line pressure depending upon the driving condition. The modifier accumulator valve 46 removes pulsation of the line pressure by smoothing the pressure modifier pressure supplied from the pressure modifier valve 42. The pilot valve 48 produces a pilot pressure for controlling the line pressure, lock-up of the torque converter, the overrun clutch, the 3-2 timing valve and so forth. The accumulator control valve 94 controls back pressure according to the driving condition. The manual selector valve 58 is associated with a manually operable selector lever and shiftable according to selector lever position for selectively distributing the line pressure for corresponding friction elements set forth above. The first and second shift valves 60 and 62 are associated with the first shift solenoid 64 for simultaneously switching connection of three lines for controlling shifting operation between first, second, third and fourth speed ratios. The second shuttle valve selectively provides the pressure for the 3-2 timing control and overrun clutch control depending upon accelerator position. Furthermore, the second shuttle valve further disables the overrun clutch for prevention of interlocking at fourth speed ratio while a throttle valve open angle is large. The overrun clutch control valve 80 serves for switching lines in order to prevent the overrun clutch from being activated while the band brake is active at the fourth speed ratio. The 4-2 relay valve 72 stores the state of driving at the fourth speed ratio and cooperates with the 4-2 sequence valve and the first and second shift valves for preventing fourth speed ratio to third speed ratio upon 4-2 down-shifting. The 4-2 sequence valve 74 prevents the band servo pressure from being drained during 4-2 shifting operation until the high clutch operating pressure and the band servo release pressure being drained. The servo charger valve 68 is active at the third and fourth speed ratios for supplying band servo operating pressure for second speed ratio for enabling 4-2 and 3-2 down-shifting. The 3-2 timing valve 70 temporarily provides neutral state for providing a delay for draining of band servo release upon 3-2 down-shifting when the vehicular speed is higher than a predetermined speed. The overrun clutch reducing valve 84 reduces operating pressure for the overrun clutch for reducing shock at initiation of engine braking. The torque converter release valve 50 prevents the torque converter pressure from becoming excessive. The lock-up control valve 52 controls lock-up activated state and deactivated state for providing smooth transition. The first shuttle valve 54 switches lines for controlling lock-up control pressure at the second, third and fourth speed ratios.

In the shown construction, an apply chamber 11a and a release chamber 11b are defined in the torque converter 10 in order to control the state of the lock-up clutch 11. Namely, when the fluid pressure is supplied to the release chamber 11b, the lock-up clutch 11 is released and when the fluid pressure is supplied to the apply chamber 11a, the lock-up clutch 11 is engaged for establishing a lock-up condition. The band brake (B/B) 28 defines a second speed servo apply chamber 28a, a third speed servo release chamber 28b and a fourth speed servo apply chamber 28c. With this construction, when second speed pressure is supplied to the second speed servo apply chamber 28a, the band brake (B/B) 28 is applied; when the third speed pressure is supplied to the third speed servo release chamber 28b, the band brake is released; and when the fourth speed pressure is supplied to the fourth speed servo apply chamber 28c, the band brake is applied.

In addition to the components set forth above, the shown embodiment of the hydraulic circuit of the automatic power transmission incorporates an variable displacement vane-type oil pump 34 associated with a feedback accumulator 32. The hydraulic circuit further comprises an oil cooler 36, a front side lubricant line 37 and a back side lubricant line 38.

Further detail of the hydraulic system of the shown embodiment of the automatic power transmission will be appreciated from the description given in the U.S. Pat. No. 4,680,992, issued on July 21, 1987, to Hayasaki et al. and from "Nissan Full-Range Electronically Controlled Automatic Transmission Service Manual", published by Nissan Motor Co., Ltd., on Mar., 1987. The disclosure of the above-identified publications are herein in incorporated for the sake of disclosure. Furthermore, Japanese Patent First (unexamined) Publication (Tokkai) Showa 62-62047 also discloses the hydraulic circuit similar to that illustrated in FIG. 3. The disclosure of this Japanese publication is herein incorporated by reference for the sake of disclosure.

Figure 4:
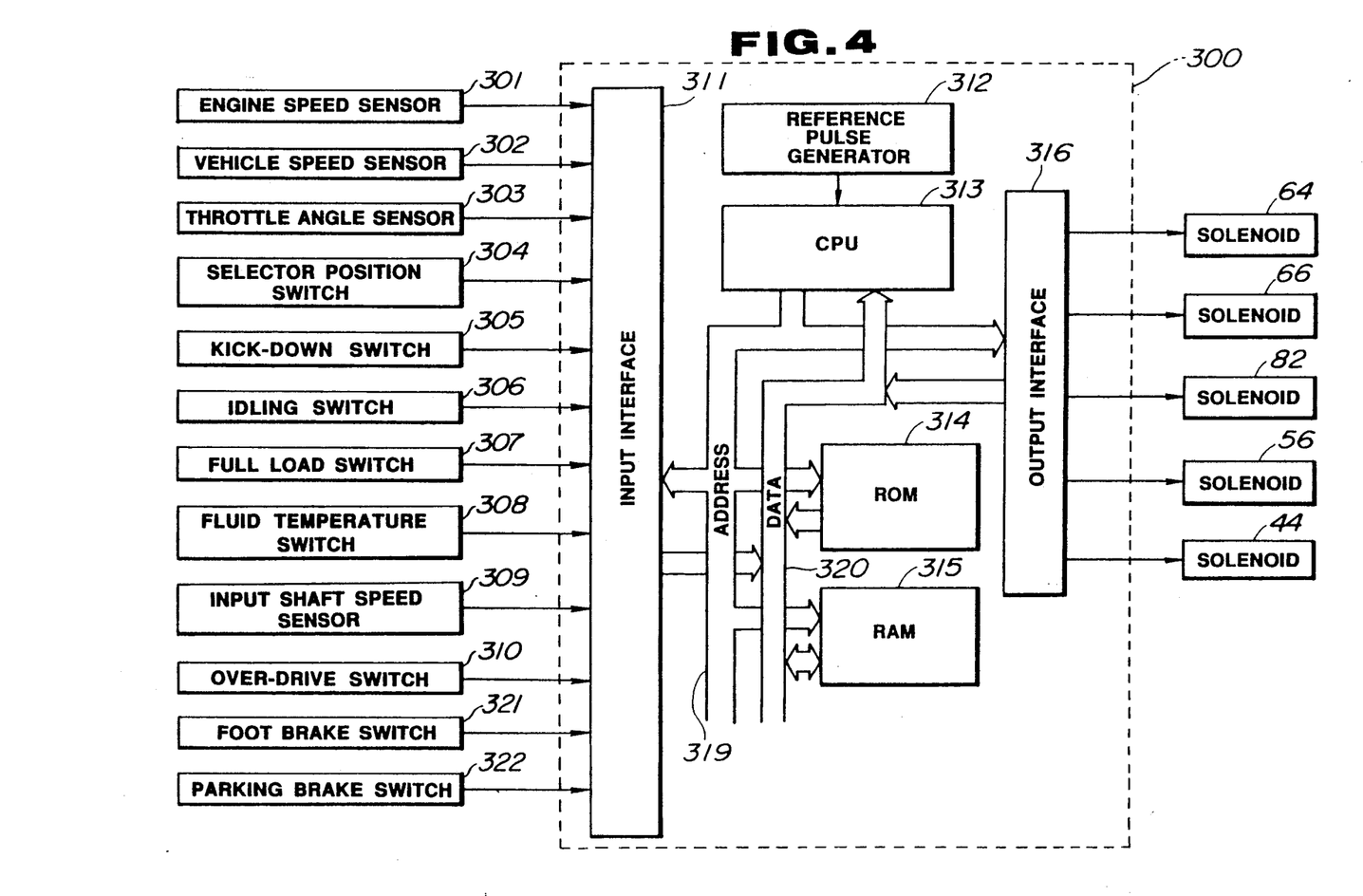
FIG. 4 is a block diagram of the preferred embodiment of a shifting control system according to the present invention.

FIG. 4 is a block diagram of a control unit 300 employed in the preferred embodiment of the transmission control system according to the present invention. The control unit 300 is composed of a microprocessor-based data processing system. The control unit 300 includes an input interface 311, a CPU 313, a ROM 314, a RAM 315 and an output interface 316. These components of the control unit 300 are connected through an address bus 319 and data bus 320. In addition, CPU 313 is connected to a reference pulse generator 312. In order to provide various transmission control parameters for enabling the control unit 300, an engine speed sensor 301, a vehicle speed sensor 302, a throttle angle sensor 303, a selector position switch 304, a kick-down switch 305, an idling switch 306, a full load switch 307, a fluid temperature switch 308, an input shaft speed sensor 309, an over-drive switch 310, a foot brake switch 321 and a parking brake switch 322, connected to the input interface 311 of the control unit 300.

The engine speed sensor 301 may comprise a crank angle sensor monitoring crankshaft angular position to produce a crank reference signal at every predetermined angular position of the crankshaft and a crank position signal at every predetermined angular displacement of the crankshaft. The engine speed sensor 301 may further comprise an engine speed counter counting up the crank reference signal over a predetermined period for deriving an engine revolution speed to output an engine speed indicative signal N. The vehicle speed sensor 302 has a per se well known construction and thus produces a vehicle speed indicative signal V.

The throttle angle sensor 303 is associated with a throttle valve in an air induction system of an internal combustion engine. The throttle angle sensor 303 monitors the throttle valve angular position and produces a throttle valve angular signal TVO. The selector position switch 304 is associated with a selector lever of the transmission to detect the selector position and thereby produces a selector position indicative signal SEL representative of the selector position. The kick-down switch 305 is associated with an accelerator pedal to detect depression magnitude of the accelerator pedal greater than a predetermined magnitude to produce a kick-down demand indicative signal.

The idle switch 306 is designed for detecting a fully closed position of the throttle valve to produce an engine idling condition indicative signal. The full load switch 307 is provided for detecting a fully open position of the throttle valve to produce an full load condition indicative signal. The fluid temperature sensor 308 monitors temperature of the lubricant in the transmission to produce a fluid temperature indicative signal. The input shaft speed sensor 309 monitors rotation speed of the transmission input shaft 13 to produce an input shaft speed indicative signal. The over-drive switch 310 is associated with the selector lever for manual operation for selecting an over-drive or a fourth speed ratio enabling state and inhibiting state for producing an over-drive enabling state indicative signal when it is enabled. The brake switch 321 is associated with a vehicular brake pedal for detecting an application of the brake for producing a braking state indicative signal. Similarly, the parking brake switch 322 detects an application state of the parking brake to produce a parking brake applied state indicative signal.

The sensors, detectors and switches set forth above provide information necessary for performing transmission shifting control. A practical process for transmission shifting control has been disclosed in the aforementioned. "Nissan Full-Range Electronically Controlled Automatic Transmission RE4R01A Service Manual". The disclosure of the publications listed hereabove are herein incorporated by reference for the sake of disclosure.

Figure 5:
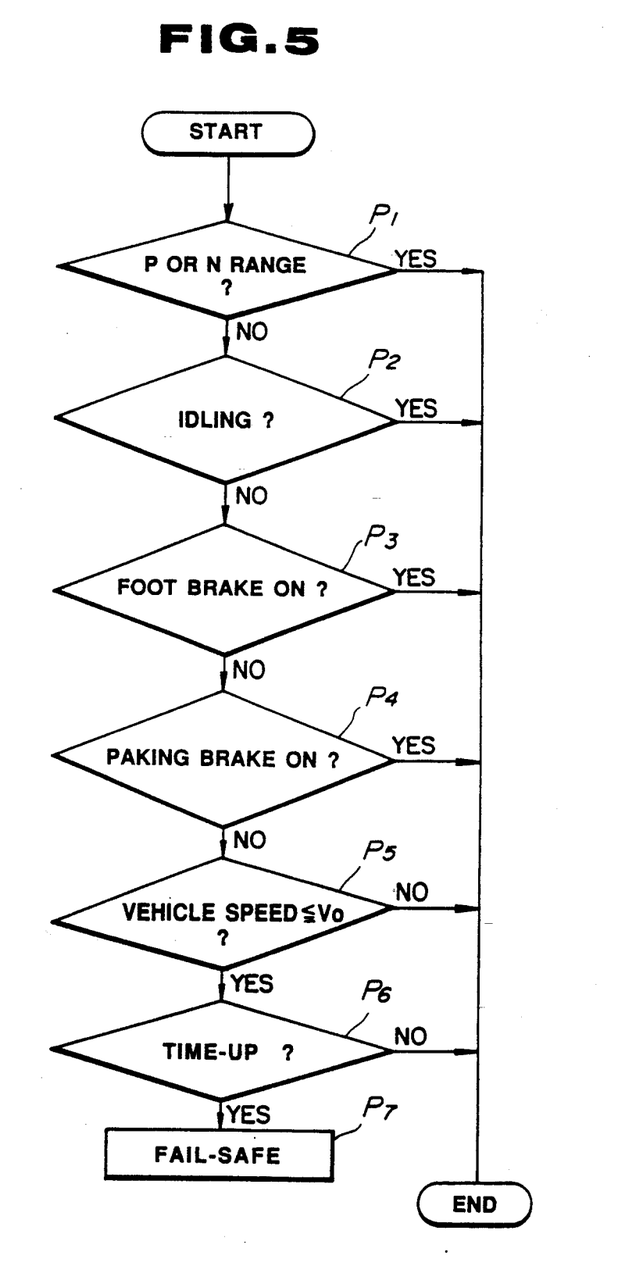
FIG. 5 is a flowchart of a routine for detecting failure of a component of the automatic power transmission and for performing fail-safe operation in response to detection of failure of components in the automatic power transmission.

In order to perform fail-detection and fail-safe operation, the control unit 300 executes a routine as shown in a form of flowchart in FIG. 5. In the shown routine, the selector position as monitored by the selector position switch 304, the engine idling state as detected by the engine idling switch 306, a vehicular braking state as detected by the foot brake switch 321, parking brake applied state as detected by the parking brake switch 322, a vehicular speed as monitored in terms of a voltage signal by the vehicle speed sensor 302.

In the practical operation, the selector position indicative signal is initially read out and checked whether it represents P range or N range selected by the selector at a step P1. If the selected transmission range is P or N range as checked at the step P1, then the process goes to an END. On the other hand, if the transmission shifting range is other than P and N range, then an idling condition indicative signal is checked at a step P2. If the idling condition indicative signal is present as checked at the step P2, then the process goes to the END. When the engine idling state indicative signal is not present and thus indicates that the throttle valve is not in a fully closed position, as checked at the step P2, a brake state indicative signal from the brake switch 321 is checked at a step P3. If the braking state indicative signal is present as checked at the step P3, then the process goes to the END. On the other hand, if the braking state indicative signal is not present, the parking brake applied state indicative signal from the parking brake switch 322 is checked at a step P4. If the parking brake applied state indicative signal is ON or present, the process goes to the END, and if not process goes to a step P5, in which the vehicle speed indicative signal value is compared with a predetermined vehicle speed criterion $V_O$. The vehicle speed criterion $V_O$ is set at a value corresponding to a relatively low vehicle speed. When the vehicle speed indicative signal value is greater than the vehicle speed criterion $V_O$ as checked at the step P5, the process goes to the END. On the other hand, when the vehicle speed indicative signal value is smaller than or equal to the vehicle speed criterion $V_O$, a timer counter is incremented by one (1) at a step P6. In the step P6, the timer counter value as incremented is compared with a timer threshold. If the timer counter value is smaller than the timer threshold as checked at the step P6, then the process goes to the END. On the other hand, when the timer counter value becomes greater than or equal to the timer threshold, then a fail-safe operation is initiated at a step P7.

In the shown embodiment, the fail-safe operation at the step P7 takes place by lowering a line pressure to place the transmission in neutral so as to avoid a possibility to cause subsidiary failure by failure of one component.

In brief of the foregoing process, if the transmission operational range (i.e., a selector position) is other than P or N range; the throttle valve is not in fully closed position; and neither foot brake nor parking brake are applied, the driving condition anticipated is that the vehicle has to run at a speed higher than a certain speed as represented by the vehicle speed criterion. Therefore, when the vehicle speed is lower than the speed as represented by the vehicle speed criterion at the vehicle driving condition set forth above, judgement can be made that certain friction elements are slipping. As previously discussed, at such condition, maintaining of driving may cause the slipping friction elements overheated result in seizure. Disablement of power transmission via the automatic power transmission in the fail-safe operation may assure prevention of seizure of the slipping friction elements.

As will be appreciated herefrom, the present invention is successful in detecting failure detecting operation and performing fail-safe operation.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. In an automotive vehicle having an automatic power transmission drivingly coupled with an output shaft of an engine and including a manual selector valve which is movable to assume a plurality of selector positions including a drive range position, a neutral range position, and a parking range position, the automatic power transmission being shiftable in speed ratio when the manual selector valve assumes the drive range position, a failure detecting system comprising:

first means for monitoring a set of vehicle operating variables, comparing said set of vehicle operating variables monitored with predetermined criterions, respectively, and determining a predetermined vehicle speed; and second means for detecting an actual vehicle speed and comparing said actual vehicle speed with said predetermined vehicle speed for detecting an abnormality of the automatic power transmission when said actual vehicle speed is lower than said predetermined vehicle speed, wherein said first means monitors which one of the plurality of selector positions the manual selector valve assumes and determines whether or not the manual selector valve assumes a position other than the neutral and parking range positions; monitors an engine load on the engine and determines whether or not said engine load is higher than a predetermined minimum load condition; and determines whether or not a vehicle brake is released.

2. In an automative vehicle having an automatic power transmission drivingly coupled with an output shaft of an engine and having a manual selector valve which is movable to assume a plurality of selector positions including a drive range position, a neutral range position, and a parking range position, the automatic power tranmission being shiftable in speed ratio when the manual selector valve assumes the drive range position, a failure detecting system comprising:

first means for monitoring which one of the plurality of selector positions the manual selector valve assumes and for determining whether or not the manual selector valve assumes a position other than the neutral and parking range positions;

second means for monitoring an engine load on the engine;

third means for determining whether or not an automotive brake is released;

fourth means for monitoring an actual vehicle speed; and fifth means for comparing said actual vehicle speed with a predetermined vehicle speed for detecting abnormality of the power transmission when said actual vehicle speed is lower than said predetermined vehicle speed after said engine load monitored has been higher than a predetermined minimum load condition with the automotive brake released and the selector position monitored being the drive range psotion.

3. A failure-detecting system as set forth in claim 2, wherein the automotive brake includes a foot brake and a parking brake and said third means determines whether or not both of the foot brake and the parking brake are released.

4. In an automotive vehicle having an automatic power transmission drivingly coupled with an output shaft of an engine and having a manual selector valve which is movable to assume a plurality of selector positions including a drive range position, a neutral range position, and a parking range position, the automatic power transmission being shiftable in speed ratio when the manual selector valve assumes the drive range position, a fail-safe system comprising:

first means for monitoring a set of vehicle operating variables and thus determining a predetermined vehicle driving condition when said set of vehicle operating variables monitored represents that a torque is transmitted by the automatic power transmission;

second means for detecting an actual vehicle driving condition inconsistent with said predetermined vehicle driving condition and for detecting abnormality of the automatic power transmission; and third means for performing a fail-safe operation in response to said second means detecting abnormality of the power transmission, wherein said third means decreases a line pressure which thereby places the power transmission in neutral.

5. A fail-safe system as set forth in claim 4, wherein said first means compares said set of vehicle operating variables monitored with predetermined criterions, respectively, and determines a predetermined vehicle speed, said second means detects an actual vehicle speed and compares said actual vehicle speed with said predetermined vehicle speed for detecting abnormality of the automatic power transmission when said actual vehicle speed is lower than said predetermined vehicle speed.

6. A fail-safe system as set forth in claim 5, wherein said first means monitors which one of the plurality of selector positions the manual selector valve assumes and determines whether or not the manual selector valve assumes a position other than the neutral and parking range positions; monitors an engine load on the engine and determines whether or not said engine load is higher than a predetermined minimum load condition; and determines whether or not a vehicle brake is released.

7. In an automotive vehicle having an automatic power transmission drivingly coupled with an output shaft of an engine and having a manual selector valve which is movable to assume a plurality of selector positions including a drive range position, a neutral range position, and a parking range position, the automatic power transmission being shiftable in speed ratio when the manual selector valve assumes the drive range position, a fail-safe system comprising:

first means for monitoring which one of the plurality of selector positions the manual selector valve assumes and determines whether or not the manual selector valve assumes a position other than the neutral and parking range positions;

second means for monitoring an engine load on the engine;

third means for determining whether or not an automotive brake is released;

fourth means for monitoring an actual vehicle speed;

fifth means for comparing said actual vehicle speed with a predetermined vehicle speed for detecting abnormality of the power transmission when said actual vehicle speed is lower than said predetermined vehicle speed after said engine load monitored has been higher than a predetermined minimum load condition with the automotive brake released and the selector position monitored being the drive range position; and sixth means for performing a fail-safe operation in response to said fifth means detecting abnormality of the power transmission.

8. A fail-safe system as set forth in claim 7, wherein said sixth means decreases a line pressure for placing the transmission in neutral.

9. A fail-safe system as set forth in claim 11, wherein the automotive brake includes a foot brake and a parking brake and said third means determines whether or not both of the foot brake and the parking brake are released.

10. A method of detecting abnormality of an automatic power transmission in an automotive vehicle having an engine, a selector position switch, an idling switch, a brake switch, and a vehicle speed sensor, the automatic power transmission having a manual selector valve which is movable to assume a plurality of selector positions including a drive range position, a neutral range position, and a parking range position, the method comprising the steps of:

a first step of determining whether or not the selector position switch represents that the manual selector valve assumes the drive range position;

a second step of determining whether or not the idling switch represents an idling state of the engine;

a third step of determining whether or not the brake switch represents that a vehicle brake of the automotive vehicle is applied;

a fourth step of determining whether or not a vehicle speed as detected by the vehicle speed sensor is lower than a predetermined vehicle speed after it has been determined that the selector position switch represents that the manual selector valve assumes the drive range position, the idling switch fails to represent the idling state of the engine, and the brake switch fails to represent that the vehicle brake of the automotive brake is applied; and a fifth step of making a judgment that abnormality exits in the automatic power transmission after said fourth step has been repeated without any interruption during a predetermined period of time.

11. A method of conducting a fail-safe operation upon detecting abnormality of an automatic power transmission in an automotive vehicle having an engine, a selector position switch, an idling switch, a brake switch, and a vehicle speed sensor, the automatic power transmission having a manual selector valve which is movable to assume a plurality of selector positions including a drive range position, a neutral range position, and a parking range position, the method comprising the steps of:

a first step of determining whether or not the selector position switch represents that the manual selector valve assumes the drive range position;

a second step of determining whether or not the idling switch represents an idling state of the engine;

a third step of determining whether or not the brake switch represents that a vehicle brake of the automobile vehicle is applied;

a fourth step of determining whether or not a vehicle speed as detected by the vehicle speed sensor is lower than a predetermined vehicle speed after it has been determined that the selector position switch represents that the manual selector valve assumes the drive range position, the idling switch fails to represent the idling state of the engine, and the brake switch fails to represent that the vehicle brake of the automotive brake is applied;

a fifth step of making a judgment that abnormality exits in the automatic power transmission after said fourth step has been repeated without any interruption during a predetermined period of time; and a sixth step of placing the automatic power transmission in neutral when said judgment is made in said fifth step.

* * * * *